United States Patent
Wotzak

(10) Patent No.: US 9,657,646 B2
(45) Date of Patent: May 23, 2017

(54) AIRCRAFT ENGINE DRIVESHAFT VESSEL ASSEMBLY AND METHOD OF ASSEMBLING THE SAME

(71) Applicant: General Electric Company, Schenectady, NY (US)

(72) Inventor: Mark Gregory Wotzak, Somerville, MA (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 14/395,879

(22) PCT Filed: Apr. 19, 2013

(86) PCT No.: PCT/US2013/037270
§ 371 (c)(1),
(2) Date: Oct. 21, 2014

(87) PCT Pub. No.: WO2014/018137
PCT Pub. Date: Jan. 30, 2014

(65) Prior Publication Data
US 2015/0139791 A1    May 21, 2015

Related U.S. Application Data

(60) Provisional application No. 61/637,954, filed on Apr. 25, 2012.

(51) Int. Cl.
*F02C 7/36*    (2006.01)
*F02C 7/32*    (2006.01)
(Continued)

(52) U.S. Cl.
CPC .............. *F02C 7/36* (2013.01); *F01D 9/041* (2013.01); *F01D 9/065* (2013.01); *F01D 25/28* (2013.01);
(Continued)

(58) Field of Classification Search
CPC .......... F01D 9/041; F01D 9/056; F01D 25/28; F02C 7/32; F02C 7/36; F02K 3/06; Y02T 50/673; Y10T 29/49229
See application file for complete search history.

(56) References Cited

U.S. PATENT DOCUMENTS 6,195,983 B1    3/2001    Wadia et al.
7,233,295 B2    6/2007    Regala
(Continued)

FOREIGN PATENT DOCUMENTS

CN    102317608 A    1/2012
EP       0298011 A1    1/1989
(Continued)

OTHER PUBLICATIONS

Unofficial English translation of Chinese Office Action issued in connection with corresponding CN Application No. 201380021840.X on May 14, 2015.
(Continued)

*Primary Examiner* — Igor Kershteyn
(74) *Attorney, Agent, or Firm* — Pamela A. Kachur

(57) ABSTRACT

A driveshaft vessel assembly for a gas turbine engine is disclosed. The driveshaft vessel assembly comprises a driveshaft vessel and an outlet guide vane. The driveshaft vessel includes a forward face, an aft face, and opposing side faces and is configured to house at least a portion of a radial driveshaft. The outlet guide vane includes a leading edge and a trailing edge. The length of the trailing edge is substantially equal to a length of the forward face of the driveshaft vessel such that the trailing edge of the outlet guide vane is faired into the forward face of the driveshaft vessel.

20 Claims, 3 Drawing Sheets

(51) Int. Cl.
  *F01D 25/28* (2006.01)
  *F01D 9/04* (2006.01)
  *F01D 9/06* (2006.01)
  *F02K 3/06* (2006.01)

(52) U.S. Cl.
  CPC .................. *F02C 7/32* (2013.01); *F02K 3/06* (2013.01); *Y02T 50/673* (2013.01); *Y10T 29/49229* (2015.01)

(56) References Cited

U.S. PATENT DOCUMENTS

| | | | |
|---|---|---|---|
| 8,042,341 | B2 | 10/2011 | Charier et al. |
| 8,661,781 | B2 | 3/2014 | Moore et al. |
| 9,121,351 | B2 * | 9/2015 | Ress, Jr. .................. F02C 7/32 |
| 9,297,312 | B2 * | 3/2016 | Chuong .................. F02C 7/20 |
| 2006/0101804 | A1 | 5/2006 | Stretton |
| 2006/0248900 | A1 * | 11/2006 | Suciu ........................ F02C 7/32 60/802 |
| 2007/0084218 | A1 * | 4/2007 | Udall ..................... F01D 9/041 60/796 |
| 2007/0130912 | A1 | 6/2007 | Kraft et al. |
| 2008/0159851 | A1 | 7/2008 | Moniz et al. |
| 2008/0173114 | A1 | 7/2008 | Charier |
| 2009/0097963 | A1 | 4/2009 | Evans |
| 2009/0104027 | A1 | 4/2009 | Duchatelle et al. |
| 2010/0080697 | A1 | 4/2010 | Wojno et al. |
| 2010/0206982 | A1 | 8/2010 | Moore |
| 2011/0095951 | A1 | 4/2011 | McCarthy et al. |

FOREIGN PATENT DOCUMENTS

| | | | |
|---|---|---|---|
| EP | 0486082 | A1 | 5/1992 |
| EP | 0798454 | A2 | 10/1997 |
| EP | 0861776 | A1 | 9/1998 |
| EP | 1852346 | A1 | 11/2007 |
| EP | 1911938 | A1 | 4/2008 |
| EP | 2169182 | A2 | 3/2010 |
| GB | 926947 | A | 5/1963 |
| JP | 2002081326 | A | 3/2002 |
| JP | 2004316474 | A | 11/2004 |
| JP | 2007154901 | A | 6/2007 |
| JP | 2007516376 | A | 6/2007 |
| JP | 2008163950 | A | 7/2008 |
| JP | 2009092062 | A | 4/2009 |

OTHER PUBLICATIONS

International Search Report and Written Opinion issued in connection with corresponding WO application PC T/US2013/037270 on Feb. 27, 2014.

Unofficial English Translation of Japanese Office Action issued in connection with corresponding JP Application No. 2015507199 on Dec. 1, 2015.

* cited by examiner

AIRCRAFT ENGINE DRIVESHAFT VESSEL ASSEMBLY AND METHOD OF ASSEMBLING THE SAME

CROSS REFERENCE TO RELATED APPLICATIONS

This application claims priority to U.S. Provisional Application No. 61/637,954 filed Apr. 25, 2012, which is hereby incorporated by reference in its entirety.

BACKGROUND

The application described herein relates generally to gas turbine engines components, and more specifically to methods and assemblies for outlet guide vanes and driveshaft vessels.

At least some known gas turbine engine assemblies include a fan assembly that is mounted upstream from a core gas turbine engine. During operation, a portion of the airflow discharged from the fan assembly is channeled downstream to the core gas turbine engine wherein the airflow is further compressed. The compressed airflow is then channeled into a combustor, mixed with fuel, and ignited to generate hot combustion gases. The combustion gases are then channeled to a turbine, which extracts energy from the combustion gases for powering the compressor, as well as producing useful work to propel an aircraft in flight. The other portion of the airflow discharged from the fan assembly exits the engine through a fan stream nozzle.

To facilitate channeling the airflow from the fan assembly to the fan stream exhaust, at least some known gas turbine engine assemblies include an outlet guide vane assembly that is used to remove swirl in the airflow upstream of the fan exhaust. Such an outlet guide vane assembly is configured to turn the airflow discharged from the fan assembly to a substantially axial direction prior to the fan flow being exhausted from the bypass duct. In addition to straightening the fan airflow, the outlet guide vane assembly also provides structural stiffness to the fan frame. More specifically, outlet guide vane assemblies generally include a plurality of outlet guide vanes that are coupled to the fan frame.

In addition to outlet guide vanes, many fan frame assemblies include one or more (frequently two, diametrically opposed) dividing structures, often called bifurcations, which divide the annular space defined by the bypass duct into two semi-annular spaces. These dividing structures are typically hollow duct-like structures through which various mechanical, electrical, pneumatic, hydraulic, or other connections (including structural supports) can pass without causing disruption to the airflow through the bypass duct. The bifurcations fair or guide the flow in aerodynamic fashion around these structures, and may be integrated or blended into the profile of an upstream guide vane to reduce the number of individual airflow disruptions.

Gas turbine engines also typically include an accessory gear box normally mounted in its own casing at the exterior of the gas turbine engine casing. The gear box is mechanically interconnected to the primary central driveshaft of the engine through a radial driveshaft. During normal operation, the radial driveshaft transfers power from the engine core to the accessory gearbox, and, during engine startup, the radial driveshaft also transfers power from the starter located in the accessory gearbox to the engine core.

Since the radial driveshaft runs through the fan stream of the engine, the driveshaft requires a protective cover to contain surrounding air and oil required for standard driveshaft operation. Hollow struts are typically used to contain the radial driveshaft along with other services necessary for operation, such as oil or air lines, that run from the core of the engine to the gearbox. These struts that cover the radial driveshaft run through the fan stream and cause significant drag, which has a negative effect on specific fuel consumption and efficiency. Accordingly, there remains a need for a driveshaft vessel assembly covering the radial driveshaft while minimizing drag by eliminating the presence of a strut.

BRIEF DESCRIPTION

In one aspect, a driveshaft vessel assembly for a gas turbine engine comprising an axis of rotation is provided. The driveshaft vessel assembly comprises a driveshaft vessel and an outlet guide vane. The driveshaft vessel includes a forward face, an aft face, and opposing side faces and is configured to house at least a portion of a radial driveshaft. The outlet guide vane includes a leading edge and a trailing edge. The length of the trailing edge is substantially equal to a length of the forward face of the driveshaft vessel such that the trailing edge of the outlet guide vane is faired into the forward face of the driveshaft vessel.

In another aspect, a method of assembling a driveshaft vessel assembly for a gas turbine engine is provided. The method comprises providing a driveshaft vessel including a forward face, an aft face, and opposing side faces. The driveshaft vessel is configured to house at least a portion of a radial driveshaft. An outlet guide vane including a leading edge and a trailing edge is also provided. The method further includes coupling the outlet guide vane to the driveshaft vessel such that the trailing edge of the outlet guide vane is faired into the forward face of the driveshaft vessel.

In yet another aspect, a gas turbine engine is provided. The gas turbine engine comprises a core gas turbine engine comprising an axis of rotation and an accessory gearbox mounted radially outward from the core gas turbine engine. The gas turbine engine further includes a driveshaft extending radially between the core gas turbine engine and the accessory gearbox; and a driveshaft vessel assembly configured to house at least a portion of the radial driveshaft. The driveshaft vessel assembly comprises a driveshaft vessel including a forward face, an aft face, and opposing side faces and an outlet guide vane including a leading edge and a trailing edge. The trailing edge includes a length substantially equal to a length of the forward face such that the trailing edge of the outlet guide vane is faired into the forward face of the driveshaft vessel.

DETAILED DESCRIPTION

Figure 1:
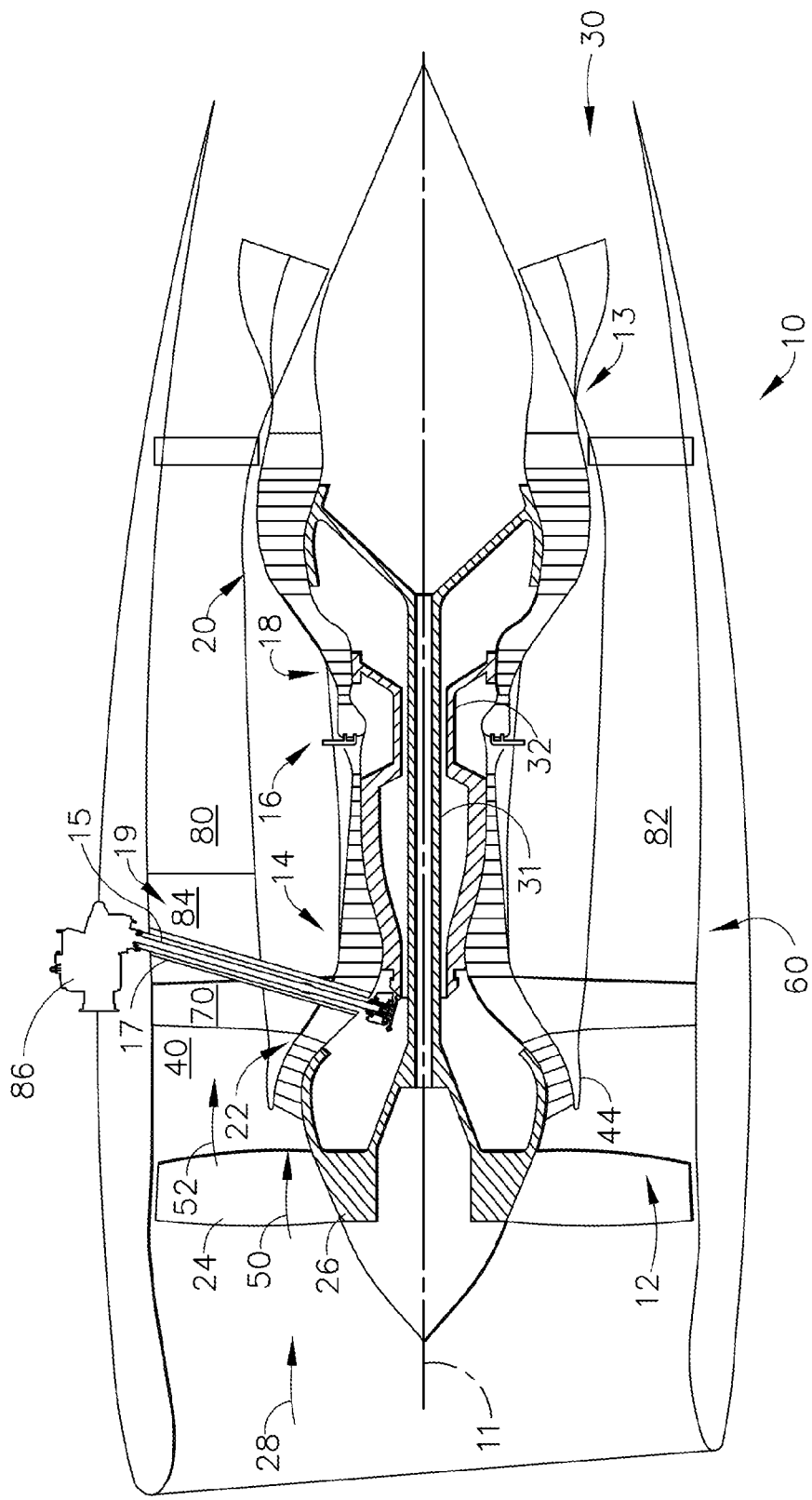
FIG. 1 is a cross-sectional schematic illustration of an exemplary gas turbine engine.

FIG. 1 is a cross-sectional schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 22, and a splitter 44 that substantially circumscribes booster 22. Core gas turbine engine assembly 10 also includes a radial driveshaft 15 that extends from core gas turbine engine 13 through fan assembly 12 and into a fan casing 42 for connection with an accessory gear box 86. Radial driveshaft 15 is housed within a driveshaft vessel 17, which is a component of a driveshaft vessel assembly 19, to be described in greater detail hereinafter.

Fan assembly 12 includes an array of fan blades 24 extending radially outward from a rotor disk 26. Gas turbine engine assembly 10 has an intake side 28 and an exhaust side 30. Fan assembly 12, booster 22, and turbine 20 are coupled together by a first rotor shaft 31, and compressor 14 and turbine 18 are coupled together by a second rotor shaft 32. In the exemplary embodiment, engine assembly 10 may be, but is not limited to being, a LEAP or Passport 20 gas turbine engine available from General Electric Company.

In operation, air flows through fan assembly 12 and a first portion 50 of the airflow is channeled through booster 22. The compressed air that is discharged from booster 22 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around the core gas turbine engine 13. More specifically, bypass duct 40 extends between fan casing 42 and splitter 44. Accordingly, first portion 50 of the airflow from fan assembly 12 is channeled through booster 22 and then into compressor 14 as described above, and second portion 52 of the airflow from fan assembly 12 is channeled through bypass duct 40 to provide thrust for an aircraft, for example. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that typically extend substantially radially, between a radially-outer mounting flange and a radially-inner mounting flange, and are circumferentially-spaced within bypass duct 40. Guide vanes 70 serve to turn the airflow downstream from rotating blades such as fan blades 24. At least one king outlet vane 72 of said plurality of outlet guide vanes 70 is included in driveshaft vessel assembly 19.

Driveshaft vessel assembly 19 includes king outlet guide vane 72, driveshaft vessel 17, and bifurcation panels 84. Driveshaft vessel assembly 19 is coupled between fan casing 42 and splitter 44 such that driveshaft vessel assembly 19 extends radially through bypass duct 40. As air flows through bypass duct 40, the air encounters leading edge 74 of king outlet vane 72, is directed around driveshaft vessel 17 by widened trailing edge 75 of king outlet vane 72, and passes over bifurcation panels 84 and a bifurcations 80 or 82.

Bifurcations 80 and 82 are hollow duct-like structures through which various mechanical, electrical, pneumatic, hydraulic, or other connections (including structural supports) can pass without causing disruption to the airflow through the bypass duct 40. In a typical installation of the gas turbine engine 10 under the wing of an aircraft (not shown), upper bifurcation 80 houses the engine mounts and various electrical, hydraulic, and pneumatic systems while the lower bifurcation houses oil drains and other subsystems. Bifurcations 80 and 82 guide the flow in aerodynamic fashion around these structures. As will become apparent with respect to FIGS. 2-3, bifurcation panels 84 serve to fair bifurcation 80 or 82 with driveshaft vessel 19. While the figures herein illustrate two (upper and lower) bifurcations, it is possible that for certain configurations (including certain engine mounting arrangements) that either a single bifurcation or three or more bifurcations may be utilized.

Figure 2:
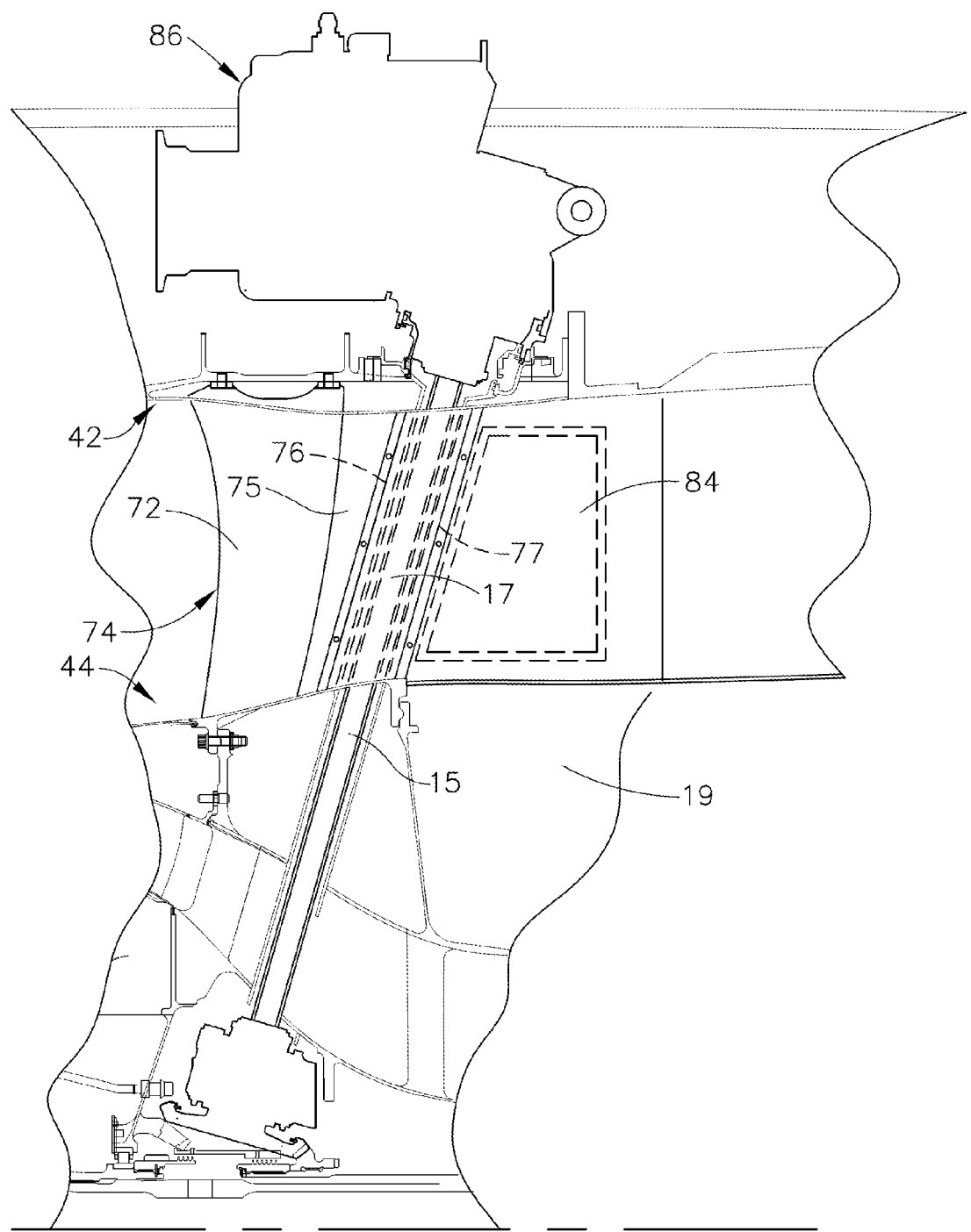
FIG. 2 is a cross-sectional view of a driveshaft vessel assembly which may be used with the gas turbine engine shown in FIG. 1.

FIG. 2 is a cross-sectional view of driveshaft vessel assembly 19 which may be used with gas turbine engine assembly 10 shown in FIG. 1, and in accordance with an exemplary embodiment of the present invention, driveshaft vessel assembly 19 includes a king outlet guide vane 72, a driveshaft vessel 17, and bifurcation panels 84. Only one bifurcation panel is shown in FIG. 2 to allow for viewing of radial driveshaft 15 and driveshaft vessel 17, but typically two are used in each driveshaft vessel assembly 19.

Driveshaft vessel 17 includes a forward face 76, an aft face 77, and non-parallel opposite side faces 78 that connect forward face 76 to aft face 77 such that the width of aft face 77 is greater than the width of forward face 76. Generally, the profile of aft face 77 is larger than the profile of forward face 76. Airfoil-shaped king outlet guide vane 72 includes leading edge 74 and a trailing edge 75 that widens to a substantially equal width as forward face 76 such that the structures of trailing edge 75 is faired into forward face 76 when king guide vane 72 and driveshaft vessel 17 are coupled together. Bifurcation panels 84 are coupled to side faces 78 of driveshaft vessel 17 and serve to fair the structure of driveshaft vessel 17 with bifurcation 80 thus minimizing drag. Again, only one bifurcation panel 84 is shown in FIG. 2 to allow for viewing of other structures.

Driveshaft vessel assembly 19 is a separate component that can be inserted into fan frame assembly 60 after plurality of outlet guide vanes 70 and other structural components are assembled. Driveshaft vessel 17 has at least one sealing structures where it is coupled to fan casing 42 and at least one sealing structure where driveshaft vessel 17 is coupled to splitter 44 to seal against orifices leading to oil wetted areas. The sealing structures allow fluids, such as but not limited to oil, to flow around driveshaft 15 without exposing driveshaft 15 to second portion 52 of airflow. Vessel 17 is hollow to allow radial driveshaft 15 to pass through and is combined with king guide vane 72 and bifurcation panels 84 to maximize smooth air flow and minimize drag.

Combining driveshaft vessel 17 with king outlet guide vane 72 and bifurcation panels 84 negates the need for a separate strut to house radial driveshaft 15. Typically, a separate strut housing radial driveshaft 15 is placed in bypass duct 40, which leads to significant drag on the system contributing to losses in efficiency and specific fuel consumption. Driveshaft vessel assembly 19 satisfies the need to protect radial driveshaft 15 from the fan stream while minimizing the losses associated with having a strut present in the fan stream.

A strut typically provides structural support to fan frame assembly 60. However, because driveshaft vessel assembly 19 is configured such that a separate strut is not required, king outlet guide vane 72 is coupled to fan case 42 splitter 44 so as to provide the necessary support required by fan frame assembly 60.

Figure 3:
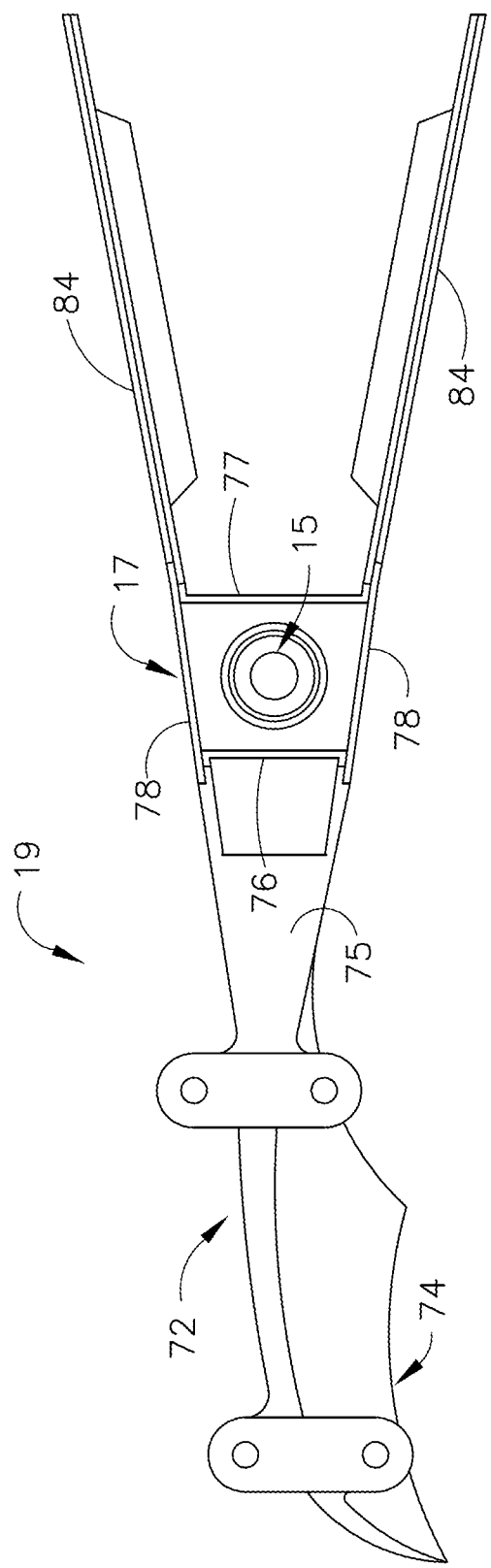
FIG. 3 is a top view of a driveshaft vessel assembly which may be used with the gas turbine engine shown in FIG. 1.

FIG. 3 shows a top view of driveshaft vessel assembly 19. Incoming swirling air flow from fan blade array 24 meets leading edge 74 of king outlet guide vane 72, which straightens the flow and directs it toward widened trailing edge 75 of king outlet guide vane 72. Widened trailing edge 75 is coupled to forward face 76 of driveshaft vessel 17 such that the air flow is directed smoothly around both side faces 78 of driveshaft vessel 17. The air flow then encounters bifurcation panels 84, which are coupled to side faces 78 of driveshaft vessel 17. Bifurcation panels 84 allow the air to flow smoothly around driveshaft vessel 17 and onto airfoil-shaped bifurcation 80 or 82.

The king outlet guide vane 72, driveshaft vessel 17, and bifurcation panels 84 are coupled together to allow a streamlined airflow around driveshaft vessel assembly 19 that minimizes drag while allowing radial driveshaft 15 to pass through the fan stream.

Exemplary embodiments of an aircraft engine driveshaft vessel assembly 19 are described above in detail. Driveshaft vessel assembly 19 is not limited to the specific embodiments described herein, but rather, components of driveshaft vessel assembly 19 may be utilized independently and separately from other components described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A driveshaft vessel assembly for a gas turbine engine comprising an axis of rotation, said assembly comprising:
    a driveshaft vessel configured to house at least a portion of a radial driveshaft, said driveshaft vessel including a forward face, an aft face, and opposing side faces; and
    an outlet guide vane including a leading edge and a trailing edge, wherein said trailing edge includes a length substantially equal to a length of said forward face such that said trailing edge of said outlet guide vane is faired into said forward face of said driveshaft vessel.

2. The driveshaft vessel assembly in accordance with claim 1 further comprising a bifurcation panel coupled to each of said opposing side faces.

3. The driveshaft vessel assembly in accordance with claim 2, wherein said bifurcation panels are configured to fair said driveshaft vessel into a downstream bifurcation.

4. The driveshaft vessel assembly in accordance with claim 1, wherein said opposing side faces are non-parallel.

5. The driveshaft vessel assembly in accordance with claim 1, wherein said length of said forward face is less than a length of said aft face.

6. The driveshaft vessel assembly in accordance with claim 1, wherein said trailing edge is coupled to said forward face to facilitate directing airflow around said driveshaft vessel.

7. The driveshaft vessel assembly in accordance with claim 1, wherein said driveshaft vessel assembly extends radially within a bypass duct between a fan casing and an airflow splitter.

8. The driveshaft vessel assembly in accordance with claim 7 further comprising at least one sealing structure coupled between said fan casing and said driveshaft vessel and at least one sealing structure coupled between said airflow splitter and said driveshaft vessel to facilitate fluid flow around said radial driveshaft.

9. A method of assembling a driveshaft vessel assembly for a gas turbine engine, said method comprising:
    providing a driveshaft vessel including a forward face, an aft face, and opposing side faces, the driveshaft vessel configured to house at least a portion of a radial driveshaft;
    providing an outlet guide vane including a leading edge and a trailing edge; and
    coupling the outlet guide vane to the driveshaft vessel such that the trailing edge of the outlet guide vane is faired into the forward face of the driveshaft vessel.

10. A method in accordance with claim 9 further comprising coupling a bifurcation panel to each of the opposing side faces.

11. A method in accordance with claim 10, wherein the bifurcation panels are configured to fair the driveshaft vessel into a downstream bifurcation.

12. A method in accordance with claim 9 further comprising coupling the trailing edge to the forward face to facilitate airflow directing around the driveshaft vessel.

13. A method in accordance with claim 9, wherein the opposing side faces are non-parallel such that the length of the forward face is less than a length of the aft face.

14. A method in accordance with claim 9, wherein the driveshaft vessel assembly extends radially within a bypass duct between a fan casing and an airflow splitter.

15. A gas turbine engine comprising:
    a core gas turbine engine comprising an axis of rotation;
    an accessory gearbox mounted radially outward from the core gas turbine engine;
    a driveshaft extending radially between the core gas turbine engine and the accessory gearbox; and
    a driveshaft vessel assembly configured to house at least a portion of the radial driveshaft, said driveshaft vessel assembly comprising:
    a driveshaft vessel including a forward face, an aft face, and opposing side faces; and
    an outlet guide vane including a leading edge and a trailing edge, wherein said trailing edge includes a length substantially equal to a length of said forward face such that said trailing edge of said outlet guide vane is faired into said forward face of said driveshaft vessel.

16. The gas turbine engine in accordance with claim 15 further comprising a bifurcation panel coupled to each of said opposing side faces and configured to fair said driveshaft vessel into a downstream bifurcation.

17. The gas turbine engine in accordance with claim 15, wherein said opposing side faces are non-parallel such that said length of said forward face is less than a length of said aft face.

18. The gas turbine engine in accordance with claim 15, wherein said trailing edge is coupled to said forward face to facilitate directing airflow around said driveshaft vessel.

19. The gas turbine engine in accordance with claim 15, wherein said driveshaft vessel assembly extends radially within a bypass duct between a fan casing and an airflow splitter.

20. The gas turbine engine in accordance with claim 15, wherein said driveshaft vessel assembly is configured to direct airflow around said radial driveshaft to facilitate minimizing drag.

\* \* \* \* \*